(12) United States Patent
Kato

(10) Patent No.: US 8,916,646 B2
(45) Date of Patent: Dec. 23, 2014

(54) ADDITION CURABLE SELF-ADHESIVE SILICONE RUBBER COMPOSITION

(71) Applicant: Shin-Etsu Chemical Co., Ltd., Tokyo (JP)

(72) Inventor: Nobu Kato, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/960,417

(22) Filed: Aug. 6, 2013

(65) Prior Publication Data
US 2014/0051806 A1 Feb. 20, 2014

(30) Foreign Application Priority Data

Aug. 20, 2012 (JP) ................. 2012-181686

(51) Int. Cl.
| | | |
|---|---|---|
| C08L 83/04 | (2006.01) | |
| C09J 183/06 | (2006.01) | |
| C09J 183/04 | (2006.01) | |
| C08G 77/12 | (2006.01) | |
| C08G 77/20 | (2006.01) | |
| C08G 77/00 | (2006.01) | |

(52) U.S. Cl.
CPC .............. *C09J 183/06* (2013.01); *C09J 183/04* (2013.01); *C08L 83/04* (2013.01); *C08G 77/12* (2013.01); *C08G 77/20* (2013.01); *C08G 77/80* (2013.01)
USPC .......................................... 524/866; 524/492

(58) Field of Classification Search
CPC ....... C09J 183/04; C09J 183/06; C08L 83/00; C08L 83/04
USPC ................................. 524/492, 866
See application file for complete search history.

(56) References Cited

U.S. PATENT DOCUMENTS

| | | | |
|---|---|---|---|
| 4,834,721 | A | 5/1989 | Onohara et al. |
| 5,405,896 | A | 4/1995 | Fujiki et al. |
| 5,879,809 | A | 3/1999 | Muramatsu et al. |
| 5,989,704 | A | 11/1999 | Hashimoto et al. |
| 6,743,515 | B1 | 6/2004 | Muller et al. |
| 2009/0068475 | A1 | 3/2009 | Bosshammer |
| 2011/0251311 | A1 | 10/2011 | Kato et al. |

FOREIGN PATENT DOCUMENTS

| | | |
|---|---|---|
| EP | 0 276 790 B1 | 8/1988 |
| EP | 1 106 662 B1 | 1/2004 |
| EP | 2 305 765 A1 | 4/2011 |
| JP | 63-183843 A | 7/1988 |
| JP | 02-034311 B2 | 8/1990 |
| JP | 06-172738 A | 6/1994 |
| JP | 09-165516 A | 6/1997 |
| JP | 09-165517 A | 6/1997 |
| JP | 2001-200162 A | 7/2001 |
| JP | 2008-537967 A | 10/2008 |
| WO | WO 2006/100098 A1 | 9/2006 |

OTHER PUBLICATIONS

Extended European Search Report issued Oct. 30, 2013, in European Patent Application No. 13179268.1.

*Primary Examiner* — Edward Cain
(74) *Attorney, Agent, or Firm* — Birch, Stewart, Kolasch & Birch, LLP

(57) ABSTRACT

An addition curable self-adhesive silicone rubber composition comprising (A) an organopolysiloxane containing alkenyl at either end, (B) an organosilicon compound containing phenylene and SiH group, (C) an organohydrogenpolysiloxane containing two SiH groups, (D) an organohydrogenpolysiloxane containing at least three SiH groups, and (E) an addition reaction catalyst is integrally moldable with thermoplastic resins.

9 Claims, No Drawings

ADDITION CURABLE SELF-ADHESIVE SILICONE RUBBER COMPOSITION

CROSS-REFERENCE TO RELATED APPLICATION

This non-provisional application claims priority under 35 U.S.C. §119(a) on Patent Application No. 2012-181686 filed in Japan on Aug. 20, 2012, the entire contents of which are hereby incorporated by reference.

TECHNICAL FIELD

This invention relates to an addition curable silicone rubber composition having a self-adhesion ability and more particularly, to an addition curable self-adhesive silicone rubber composition which consistently establishes a tight bond to organic resins such as PA, PBT, PC and PPO, even when the silicone rubber has a high hardness.

BACKGROUND ART

Since silicone rubber has excellent characteristics including heat resistance, freeze resistance, safety, electric insulation and weather resistance, it finds widespread use in a variety of fields, for example, as automotive parts such as connector seals and spark plug boots, electric/electronic parts such as copier rolls and microwave oven gaskets, and building parts such as sealants, as well as many consumer parts such as nursing nipples and diving gears. In many of these applications, silicone rubber is used as articles combined with metals and organic resins. Many methods were proposed for manufacturing cured products of addition curable silicone rubber compositions integrated with metals and organic resins. Such integrally bonded articles are typically produced by (i) coating the surface of a molded resin with a primer, applying an uncured silicone rubber composition thereto, and curing, (ii) coating an adhesive to an interface, (iii) two-color molding so as to provide mutual engagement, and (iv) curing a self-adhesive silicone rubber composition to a molded resin. However, the use of adhesives or primers adds to the number of steps, and with a certain coating technique, the surface to be bonded may be smeared. The two-color molding method can impose limitation on the shape of integrated articles and lead to insufficient interfacial adhesion. One solution is a self-adhesive type silicone rubber composition obtained by adding an adhesive to a silicone rubber composition. The self-adhesive type silicone rubber composition eliminates the priming or coating step, shortens the operating time, reduces the cost, and improves the efficiency of operation. It constitutes an effective means for manufacturing integrally molded articles with resins.

In connection with the primerless molding of addition type heat-curable silicone rubber compositions, a number of reports have been made for bonding silicone rubber to organic resins. In one exemplary attempt, self-adhesive silicone rubber compositions are cured on resins. Many proposals were made relating to specific adhesive components for use in the self-adhesive silicone rubber compositions. In JP-8 H02-034311, for example, an organohydrogenpolysiloxane containing at least 30 mol % of silicon-bonded hydrogen atoms is added to an addition reaction curable silicone rubber composition whereby the composition is bondable to organic resins. JP-A S63-183843 discloses the integral adhesion of silicone rubber to an olefin resin having grafted thereto a compound having an aliphatic unsaturated group and a silicon-bonded hydrolyzable group. JP-A H09-165516 describes that a thermoplastic resin having added thereto a compound having an aliphatic unsaturated group and a silicon-bonded hydrogen atom is bonded and integrated to silicone rubber. JP-A H09-165517 discloses an integrally molded article in which a blend of a thermoplastic resin and a thermoplastic oligomer containing aliphatic unsaturated groups is integrally molded with an oil-bleeding silicone rubber.

However, heat-curable silicone rubber compositions of the addition reaction type fail to achieve through a brief molding step a sufficient bond to general thermoplastic resins including ABS, PC, PE, PP, PBT, PET, acrylic resins, PA, aromatic PA, PPO, PPS, and urethane resins. To acquire a bonding ability, the resins must be modified as suggested in the above patent documents. Modification of resins requires additional steps and an extra cost, and the modified resins sometimes become vulnerable to quality alteration.

Materials known to overcome these problems include self-adhesive, addition-crosslinking silicone rubber compositions as disclosed in JP-A H06-172738, JP-A 2001-200162 and JP-A 2008-537967. Specifically, an organohydrogenpolysiloxane having a SiH bond and aromatic structure in a molecule is added to the silicone rubber compositions as adhesion improver. The resulting compositions can be briefly molded and bonded to organic resins or metals.

Even when such adhesion improvers are added, adhesion or bondability is reduced depending on a crosslinking system of silicone rubber. Particularly when the rubber hardness exceeds 60 on JIS A scale, adhesion is substantially reduced and sometimes completely lost.

CITATION LIST

Patent Document 1: JP-B H02-34311
Patent Document 2: JP-A S63-183843
Patent Document 3: JP-A H09-165516
Patent Document 4: JP-A H09-165517
Patent Document 5: JP-A H06-172738
Patent Document 5: JP-A 2001-200162 (U.S. Pat. No. 6,743,515, EP 1106662)
Patent Document 6: JP-A 2008-537967 (US 20090068475, WO 2006100098)

DISCLOSURE OF INVENTION

An object of the invention is to provide an addition curable self-adhesive silicone rubber composition which is bondable with resins even in the case of high rubber hardness and moldable within a short time, and which meets the goal of producing integrally molded articles for use in automotive parts, communication equipment parts, electric/electronic parts, and consumer parts such as nursing nipples and diving gears by integrally molding the silicone rubber composition with thermoplastic resins.

The inventors have found that when a specific alkenyl-containing organopolysiloxane and a specific organohydrogenpolysiloxane are combined with an adhesion improver, the resulting silicone rubber composition consistently establishes good adhesion to a variety of resins including polycarbonate (PC), polybutylene terephthalate (PBT), polyethylene terephthalate (PET), polyamide (PA), polyphenylene oxide (PPO), polyphenylene sulfide (PPS), polyimide and polyurethane, even when the silicone rubber has a high hardness of more than 40, especially more than 60 on JIS A Durometer scale.

Accordingly, the invention provides an addition curable self-adhesive silicone rubber composition comprising (A) 100 parts by weight of a linear organopolysiloxane containing one silicon-bonded alkenyl group at each end of the molecular chain, but no alkenyl group in the midway of the molecular chain, having an average degree of polymerization of up to 1,500, and being liquid at room temperature, (B) 0.1 to 10 parts by weight of an organosilicon compound of 1 to 100 silicon atoms containing at least one phenylene structure and at least one silicon-bonded hydrogen atom per molecule, (C) 0.01 to 10 parts by weight of an organohydrogenpolysiloxane containing two silicon-bonded hydrogen atoms per molecule, but no phenylene structure in the molecule, (D) 0.1 to 30 parts by weight of an organohydrogenpolysiloxane containing at least three silicon-bonded hydrogen atoms per molecule, but no phenylene structure in the molecule, and (E) a catalytic amount of an addition reaction catalyst.

A molar ratio of total silicon-bonded hydrogen atoms in components (B), (C) and (D) to alkenyl groups in component (A) ranges from 1.0/1 to 5.0/1, and a molar ratio of silicon-bonded hydrogen atoms in component (C) to alkenyl groups in component (A) ranges from 0.01/1 to 1.0/1.

In a preferred embodiment, the silicone rubber composition may further comprise (F) 5 to 100 parts by weight of reinforcing silica fine powder, and/or (G) 0.1 to 100 parts by weight of an organopolysiloxane containing at least three silicon-bonded alkenyl groups per molecule, wherein a molar ratio of total silicon-bonded hydrogen atoms in components (B), (C) and (D) to total alkenyl groups in components (A) and (G) ranges from 1.0/1 to 5.0/1.

In another preferred embodiment, the silicone rubber composition has a 10% cure time T10 of 10 seconds to 60 seconds when measured at 130° C. for 3 minutes. Typically, the composition is used in injection molding.

ADVANTAGEOUS EFFECTS OF INVENTION

The addition curable self-adhesive silicone rubber composition cures into a silicone rubber product which is tightly bonded to a wide variety of organic resins even when the silicone rubber has a high hardness.

DESCRIPTION OF EMBODIMENTS

Component (A) which is a base polymer in the composition is an organopolysiloxane containing a silicon-bonded alkenyl group at either end of its molecular chain. Specifically, component (A) is a linear organopolysiloxane containing one silicon-bonded alkenyl group at each end of the molecular chain, but no alkenyl group in the midway of the molecular chain, and having an average degree of polymerization of up to 1,500. It is liquid at room temperature. Namely, it is a difunctional linear organopolysiloxane containing only two silicon-bonded alkenyl groups at opposite ends of the molecular chain per molecule.

Preferably component (A) is one or more organopolysiloxane having the general formula (1).

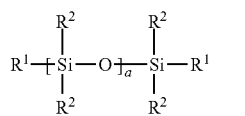

(1)

Herein $R^1$ is each independently an alkenyl group of 2 to 10 carbon atoms, preferably 2 to 8 carbon atoms, $R^2$ is each independently a substituted or unsubstituted, monovalent hydrocarbon group of 1 to 10 carbon atoms, preferably 1 to 8 carbon atoms, free of any aliphatic unsaturated bond such as alkenyl, and "a" is an integer of up to 1,500, specifically 50 to 1,500, preferably 100 to 1,500, more preferably 100 to 1,000, and even more preferably 150 to 800.

Examples of the alkenyl group of 2 to 10 carbon atoms, preferably 2 to 8 carbon atoms, represented by $R^1$ include vinyl, allyl, propenyl, butenyl, hexenyl and octenyl. Of these, vinyl, allyl, and propenyl are preferred, with vinyl being most preferred.

Examples of the optionally substituted monovalent hydrocarbon group of 1 to 10 carbon atoms, preferably 1 to 8 carbon atoms, represented by $R^2$ are those free of any aliphatic unsaturated bond such as alkenyl, and include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, and substituted forms of the foregoing groups in which some or all hydrogen atoms are substituted by halogen atoms such as fluorine, bromine and chlorine, cyano or the like, such as chloromethyl, chloropropyl, bromoethyl, trifluoropropyl, and cyanoethyl. It is preferred that at least 90 mol % of entire $R^2$ be methyl, and most preferably, all $R^2$ be methyl.

As seen from formula (1), the structure of organopolysiloxane as component (A) is preferably a linear structure which is capped with an alkenyldiorganoxy group (e.g., vinyldimethylsiloxy, vinylmethylphenylsiloxy or allyldimethylsiloxy group) at either end of the molecular chain and whose backbone consists of randomly recurring organosiloxane units (e.g., dimethylsiloxane, methylphenylsiloxane, diphenylsiloxane or methyltrifluoropropylsiloxane units). If a branched structure is in the midway of the molecular chain, not only chain extension, but also crosslinking reaction takes place during addition reaction with component (C), detracting from adhesion to organic resins.

As mentioned above, the organopolysiloxane as component (A) is a diorganopolysiloxane capped with diorganoalkenylsiloxy at either end of the molecular chain. As used herein, the term "organo" in siloxane refers to an optionally substituted monovalent hydrocarbon group exclusive of alkenyl, like $R^2$ in formula (1).

With respect to the molecular weight, the organopolysiloxane as component (A) should have an average degree of polymerization (DOP) of up to 1,500, specifically 50 to 1,500, preferably 100 to 1,500, more preferably 100 to 1,000, and even more preferably 150 to 800. With an average DOP of less than 100, no satisfactory rubber feel may be obtainable. With an average DOP of more than 1,500, the siloxane has too high a viscosity to mold. The average DOP as used herein refers to a weight average DOP, which is equivalent to weight average molecular weight, and is generally determined versus polystyrene standards by gel permeation chromatography (GPC) using toluene as development solvent.

Notably, the organopolysiloxane having an average DOP of up to 1,500, especially up to 1,000 is a self-flowing liquid at room temperature (25° C.). Preferably the organopolysiloxane has a viscosity of 100 to 200,000 mPa·s, more preferably 500 to 150,000 mPa·s at 25° C. Notably, the viscosity may be measured by a rotational viscometer such as BL, BH, BS or cone-plate type viscometer.

As long as organopolysiloxanes are linear ones containing a silicon-bonded alkenyl group at either end of the molecular chain, component (A) may be a mixture of two or more organopolysiloxanes which differ in molecular structure (for example, alkenyldiorganosiloxy group at the molecular chain end, type and number of substituent groups on diorganosiloxane units in the backbone) or DOP.

Component (B) is effective for imparting adhesion to the composition. In this sense, it may be referred to as tackifier. It is an organosilicon compound of 1 to 100 silicon atoms, preferably 2 to 30 silicon atoms, containing at least one phenylene structure and at least one silicon-bonded hydrogen (i.e., SiH group) per molecule. The term "phenylene structure" used herein encompasses aromatic ring structures having a valence of 2 to 6, preferably 2 to 4, such as phenylene, naphthalene and anthracene structures.

Suitable organosilicon compounds are those compounds of 1 to 100 silicon atoms, preferably 2 to 30 silicon atoms, more preferably 2 to 20 silicon atoms, and even more preferably 4 to 10 silicon atoms, typically linear or cyclic organosiloxane oligomers and organosilanes, which have at least one, typically 1 to 20, preferably 2 to 10 SiH groups (i.e., silicon-bonded hydrogen atoms) per molecule, have at least one, typically 1 to 4 phenylene structures, and may further contain one or more functional groups including epoxy groups such as glycidoxy, alkoxysilyl groups such as trimethoxysilyl, triethoxysilyl and methyldimethoxysilyl, ester, acrylic, methacrylic, carboxylic anhydride, isocyanate, amino or amide groups.

Exemplary organosilicon compounds are shown below.

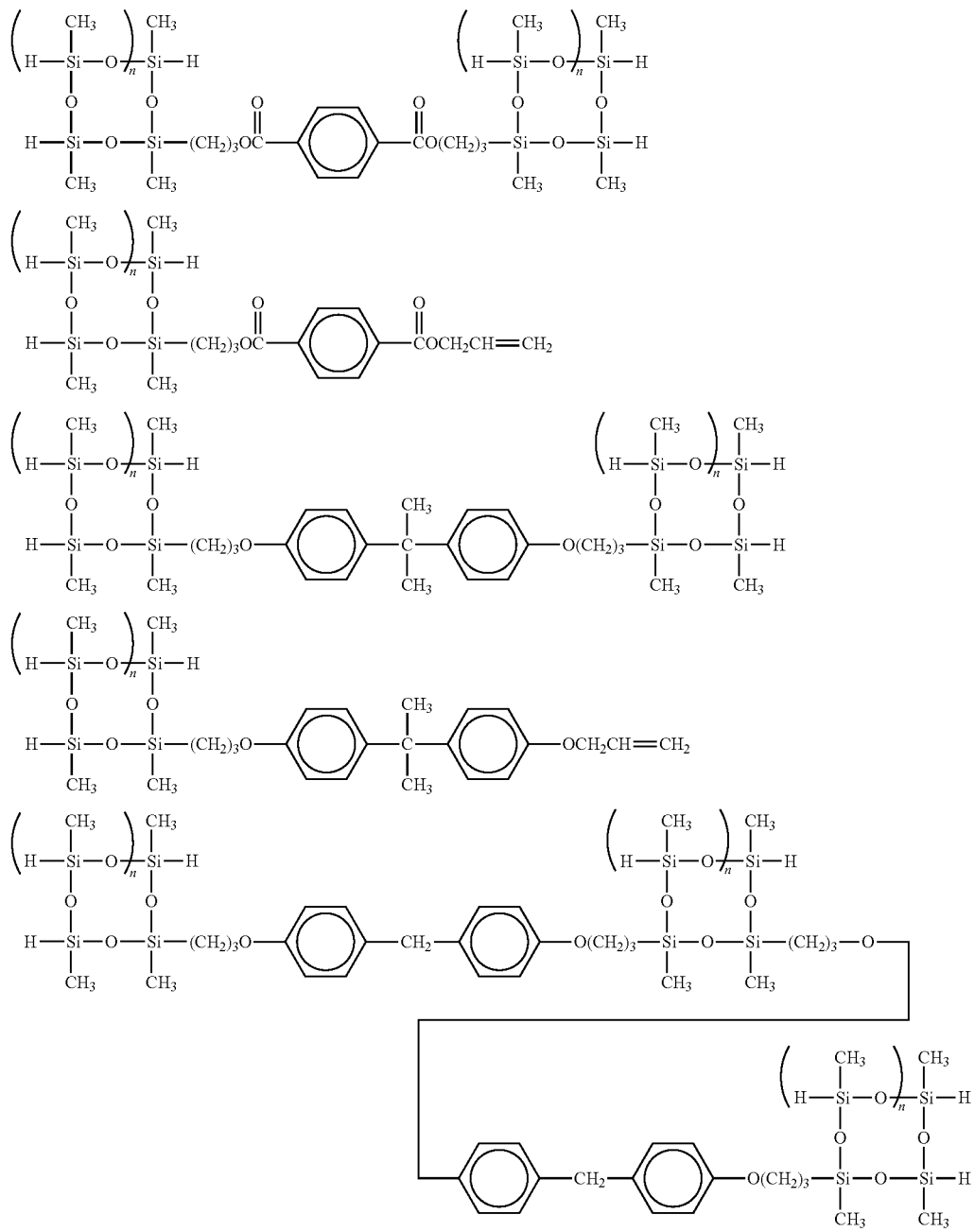

Herein n is independently an integer of 1 to 4.

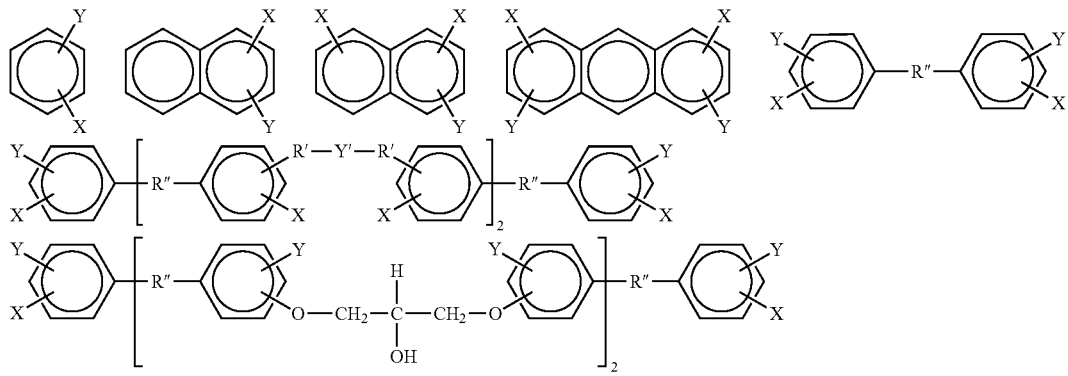

Herein X is

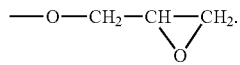

Y is either of the following groups:

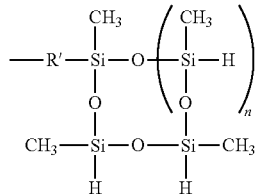

(n is an integer of 1 to 4)

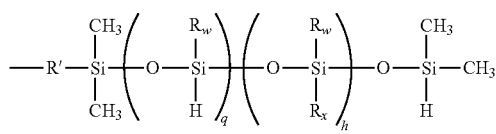

(R' is a group selected from the following.

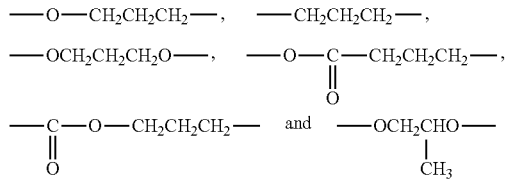

Rw and Rx each are a substituted or unsubstituted, monovalent hydrocarbon group, q=1 to 50 and h=0 to 100, preferably q=1 to 20 and h=1 to 50.).

R" is a group selected from the following.

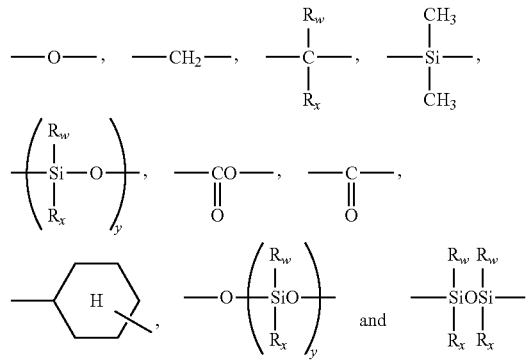

(Rw and Rx are as defined above, and y=0 to 100.)

Y' is either of the following groups:

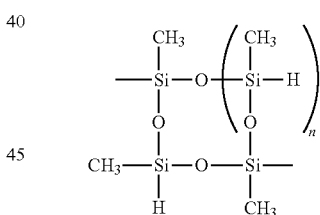

(n is an integer of 1 to 4)

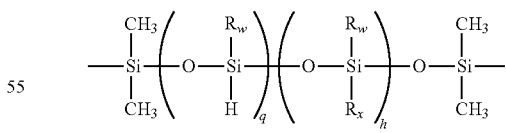

(Rw, Rx, q and h are as defined above), and z=1 to 10.

Suitable optionally substituted monovalent hydrocarbon groups represented by Rw and Rx are preferably those of 1 to 12 carbon atoms, more preferably 1 to 8 carbon atoms, and include alkyl, aryl, aralkyl, alkenyl and other groups as exemplified above for $R^1$ and $R^2$ in formula (1). Suitable substituted monovalent hydrocarbon groups include those substituted with an alkoxy, acrylic, methacrylic, acryloyl, methacryloyl, amino, or alkylamino radical.

Also useful as component (B) are the above-illustrated organosilicon compounds having further introduced therein an alkoxysilyl group such as trimethoxysilyl, triethoxysilyl or methyldimethoxysilyl, acrylic, methacrylic, ester, carboxylic anhydride, isocyanate, amino or amide group.

In the organosilicon compound as component (B), the content of silicon-bonded hydrogen atoms (i.e., SiH groups) is preferably 0.001 to 0.01 mol/g, more preferably 0.002 to 0.01 mol/g. A SiH content of less than 0.001 mol/g may fail to provide sufficient adhesion whereas an organosilicon compound having a SiH content in excess of 0.01 mol/g may be unstable at room temperature.

An appropriate amount of component (B) is 0.1 to 10 parts, preferably 0.1 to 9 parts, and more preferably 0.2 to 8 parts by weight per 100 parts by weight of component (A). Less than 0.1 part of component (B) may fail to impart sufficient adhesion whereas more than 10 parts may detract from physical properties of silicone rubber.

It is noted that the organosilicon compound as component (B) should preferably be free of any alkenyl groups. When an alkenyl-containing organosilicon compound is used as component (B), it should preferably be used in such amounts that a molar ratio of total SiH groups in the composition to total silicon-bonded alkenyl groups in the composition (specifically, a molar ratio of total SiH groups in components (B), (C) and (D) to total alkenyl groups in components (A), (B) and (G)) may range from 1.0 to 5.0, more preferably from 1.2 to 4.0, and even more preferably from 1.5 to 3.0.

Component (C) is an organohydrogenpolysiloxane containing only two silicon-bonded hydrogen atoms (i.e., SiH groups) per molecule, but no phenylene structure in the molecule, that is, difunctional organohydrogenpolysiloxane. It functions as a chain extender for extending the chain length of component (A) in that SiH groups in its molecule undergo hydrosilylation or addition reaction with silicon-bonded alkenyl groups at opposite ends of the molecular chain in component (A). The organohydrogenpolysiloxane as component (C) is preferably of linear or cyclic structure. The organohydrogenpolysiloxane as component (C) is clearly distinguished from the organosilicon compound as component (B) in that no phenylene structures are contained in the molecule. Only two SiH groups (silicon-bonded hydrogen atoms) in the molecule may be attached to either a silicon atom at the end of molecular chain or a silicon atom in the midway of the molecular chain (at a non-terminus position of molecular chain). Alternatively, one SiH group may be attached to a silicon atom at the end of molecular chain and the other SiH group to a silicon atom in the midway of the molecular chain.

Examples of the organohydrogenpolysiloxane as component (C) include diorganopolysiloxane capped with diorganohydrogensiloxy at either end of molecular chain, organohydrogensiloxane-diorganosiloxane copolymers capped with triorganosiloxy at either end of molecular chain and containing two organohydrogensiloxane units in backbone, organohydrogensiloxane-diorganosiloxane copolymers capped with diorganohydrogensiloxy at one end of molecular chain and with triorganosiloxy at the other end and containing one organohydrogensiloxane unit in backbone, and organohydrogensiloxane-diorganosiloxane cyclic copolymers containing two organohydrogensiloxane units. Suitable organohydrogenpolysiloxanes are those compounds having structures of the general formulae (2a) to (2c).

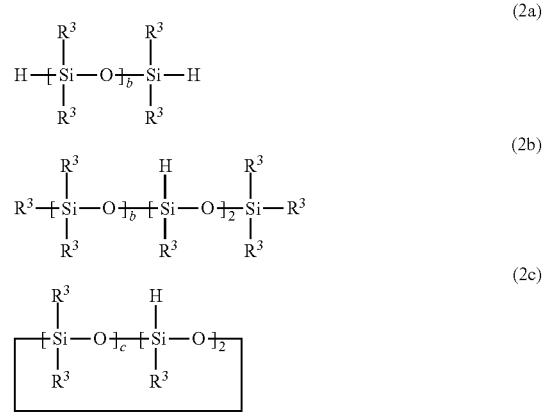

Herein $R^3$ is a substituted or unsubstituted, monovalent hydrocarbon group of 1 to 10 carbon atoms, b is an integer of 0 to 300, preferably 1 to 100, and more preferably 2 to 25, and c is an integer of 2 to 10, preferably 2 to 6, and more preferably 2 to 5.

Examples of the optionally substituted monovalent hydrocarbon group of 1 to 10 carbon atoms, preferably 1 to 8 carbon atoms, represented by $R^3$ are those free of any aliphatic unsaturated bond such as alkenyl, and include groups as exemplified above for $R^2$ in formula (1). Examples include alkyl groups such as methyl, ethyl, propyl, isopropyl, butyl, isobutyl, tert-butyl, pentyl, neopentyl, hexyl, cyclohexyl, octyl, nonyl and decyl, aryl groups such as phenyl, tolyl, xylyl and naphthyl, aralkyl groups such as benzyl, phenylethyl, and phenylpropyl, substituted forms of the foregoing groups in which some or all hydrogen atoms are substituted by halogen atoms such as fluorine, bromine and chlorine, cyano or the like, such as chloromethyl, chloropropyl, bromoethyl, trifluoropropyl, and cyanoethyl, and hydrocarbon groups having substituted thereon a functional group selected from among epoxy groups (e.g., glycidyl, glycidoxy, 3,4-epoxycyclohexyl, and 2,3-epoxycyclohexyl), alkoxysilyl groups (e.g., trimethoxysilyl, triethoxysilyl and methyldimethoxysilyl), and silanol groups (e.g., hydroxysilyl). It is preferred that at least 90 mold of entire $R^3$ be methyl, and most preferably, all $R^3$ be methyl.

The organohydrogenpolysiloxane as component (C) is blended in an amount of 0.01 to 10 parts, preferably 0.1 to 10 parts, more preferably 0.2 to 8 parts, and even more preferably 0.2 to 5 parts by weight per 100 parts by weight of component (A). Outside the range, a less amount of component (C) fails to consistently establish good adhesion to organic resin substrates when the rubber has a high hardness. More than 10 parts of component (C) adversely affects physical properties of rubber and is uneconomical.

Also, component (C) is blended in such amounts that a molar ratio of silicon-bonded hydrogen atoms (i.e., SiH groups) in component (C) to silicon-bonded alkenyl groups in component (A), simply referred to as "SiH/alkenyl," may range from 0.01/1 to 1.0/1, preferably from 0.05 to 0.9. It this SiH/alkenyl ratio is less than 0.01, no good adhesion is achieved. If this ratio exceeds 1.0, the composition does not solidify into rubber or physical properties of rubber are substantially degraded.

Component (D) is an organohydrogenpolysiloxane containing at least three silicon-bonded hydrogen atoms (i.e., SiH groups) per molecule, but no phenylene structure in the molecule. It is a polyfunctional organohydrogenpolysiloxane having a functionality of at least 3 and serves a curing or crosslinking agent in the composition.

Like component (C), the organohydrogenpolysiloxane as component (D) is clearly distinguished from the organosilicon compound as component (B) in that no phenylene structures are contained in the molecule. Also the organohydrogenpolysiloxane as component (D) is clearly distinguished from component (C) in that it is a polyfunctional organohydrogenpolysiloxane having at least three silicon-bonded hydrogen atoms (i.e., SiH groups) per molecule.

Preferably component (D) is an organohydrogenpolysiloxane which does not contain any reactive groups (e.g., aliphatic unsaturated groups, typically alkenyl) other than SiH groups in the molecule. It is an organohydrogenpolysiloxane containing at least three silicon-bonded hydrogen atoms (i.e., SiH groups) in the molecule, but not any aromatic group, typically phenyl in the molecule. The organohydrogenpolysiloxane as component (D) contains at least three (specifically 3 to 200), preferably at least four (specifically 4 to 200), more preferably 5 to 100, and even more preferably 8 to 50 silicon-bonded hydrogen atoms (or SiH groups) per molecule. Preferably it has the average compositional formula (3):

$$R^4_d H_e SiO_{(4-d-e)/2} \quad (3)$$

wherein $R^4$ is an unsubstituted or halo-substituted monovalent hydrocarbon group of 1 to 10 carbon atoms, preferably 1 to 8 carbon atoms, free of aliphatic unsaturation, d is a positive number of 0.7 to 2.1, e is a positive number of 0.001 to 1.0, and d+e is from 0.8 to 3.0.

Examples of the unsubstituted or halo-substituted monovalent hydrocarbon group of 1 to 10 carbon atoms, represented by $R^4$, are as exemplified for $R^2$ in formula (1). Preferably aromatic hydrocarbon groups such as aryl and aralkyl groups (typically phenyl) are excluded. Specifically, alkyl groups are preferred, with methyl being most preferred. The subscript d is a positive number of 0.7 to 2.1, preferably 0.8 to 2.0; e is a positive number of 0.001 to 1.0, preferably 0.01 to 1.0; and d-e is from 0.8 to 3.0, preferably 1.0 to 2.5.

With respect to the molecular structure, the organohydrogenpolysiloxane as component (D) may have a linear, cyclic, branched or three-dimensional network structure. The number of silicon atoms per molecule or degree of polymerization generally ranges from 3 to 300, preferably 4 to 200, more preferably 10 to 200, and even more preferably 15 to 100. The preferred organohydrogenpolysiloxane used herein has such a number of silicon atoms and is liquid at room temperature (25° C.). The silicon-bonded hydrogen atom may be located at the end and/or an intermediate (or non-terminus) position of the molecular chain.

Exemplary organohydrogenpolysiloxanes as component (D) include, but are not limited to, 1,3,5,7-tetramethylcyclotetrasiloxane, methylhydrogencyclopolysiloxane, methylhydrogensiloxane-dimethylsiloxane cyclic copolymers, tris(dimethylhydrogensiloxy)methylsilane, trimethylsiloxy-endcapped methylhydrogenpolysiloxane, trimethylsiloxy-endcapped dimethylsiloxane-methylhydrogensiloxane copolymers, dimethylhydrogensiloxy-endcapped dimethylsiloxane-methylhydrogensiloxane copolymers, copolymers of $(CH_3)_2HSiO_{1/2}$ and $SiO_{4/2}$ units, copolymers of $(CH_3)_3SiO_{1/2}$, $(CH_3)_2HSiO_{1/2}$, and $SiO_{4/2}$ units, copolymers of $(CH_3)_2HSiO_{1/2}$, $SiO_{4/2}$, and $(CH_3)SiO_{3/2}$ units, and copolymers of $(CH_3)_2HSiO_{1/2}$, $SiO_{4/2}$, and $(CH_3)_2SiO_{2/2}$ units. As used herein and throughout the disclosure, the term "end-capped" means that a compound is capped at both ends with the indicated group unless otherwise stated.

The organohydrogenpolysiloxane as component (D) should preferably have a content of silicon-bonded hydrogen (SiH groups) of 0.003 to 0.017 mol/g, more preferably 0.005 to 0.017 mol/g. A SiH content of less than 0.003 mol/g may lead to insufficient crosslinking whereas a siloxane with a SiH content in excess of 0.017 mol/g may be unstable.

The organohydrogenpolysiloxane as component (D) is blended in an amount of 0.1 to 30 parts, preferably 0.1 to 20 parts, and more preferably 0.3 to 15 parts by weight per 100 parts by weight of component (A). Less than 0.1 pbw of component (D) may lead to insufficient crosslinking so that the rubber may become rather sticky. More than 30 pbw of component (D) detracts from rubber physical properties and is uneconomical.

In the embodiment using an alkenyl-free organosilicon compound as component (B), components (B) to (D) are blended in such amounts that a molar ratio of total silicon-bonded hydrogen atoms (i.e., SiH groups) in components (B), (C) and (D) to alkenyl groups in component (A) (or total alkenyl groups in components (A) and (G) if component (G) is added), simply referred to as SiH/alkenyl ratio, may range from 1.0/1 to 5.0/1, preferably from 1.2 to 4.0, and more preferably from 1.5 to 3.0. A SiH/alkenyl ratio of less than 1.0 leads to a loss of adhesion. At a ratio in excess of 5.0, rubber physical properties are degraded.

Component (E) is an addition reaction catalyst. Examples include platinum base catalysts such as platinum black, platinic chloride, reaction products of chloroplatinic acid with monohydric alcohols, complexes of chloroplatinic acid with olefins, and platinum bisacetoacetate, palladium catalysts and rhodium catalysts. The catalyst may be added in a catalytic amount, specifically 0.1 to 1,000 ppm, more specifically 1 to 200 ppm of platinum group metal (e.g., platinum, palladium or rhodium) based on the weight of the organopolysiloxane (A).

In the composition, a reinforcing silica fine powder may be blended as optional component (F). The reinforcing silica fine powder may be any of silica species commonly used in the art as a reinforcement for rubber. Although any silica fine powders used in conventional silicone rubber compositions are useful, a reinforcing silica fine powder having a specific surface area of at least 50 m$^2$/g as measured by the BET method is preferred. It is advantageous to use precipitated silica (wet silica), fumed silica (dry silica) and fired silica having a BET specific surface area of 50 to 400 m$^2$/g, with the fumed silica being especially advantageous for improved rubber strength.

The reinforcing silica fine powder may be surface treated. The silica powder may be surface treated by heating and mixing the silica powder with a surface treating agent during the step of mixing the silica powder with component (A). Alternatively, the silica powder may be previously surface treated. In this case, silica particles may be directly treated in powder state.

Any of well-known techniques may be used for the surface treatment. For example, an untreated silica fine powder and a surface treating agent are admitted into a mechanical milling device closed under atmospheric pressure or a fluidized bed where they are mixed to effect surface treatment at room temperature or elevated temperature, optionally in the presence of an inert gas. If desired, a catalyst is used to promote the surface treatment. After thorough admixing, the powder is dried, yielding a treated silica fine powder. The amount of the surface treating agent used is at least the theoretical amount calculated from the surface area to be covered with the agent.

Suitable treating agents include silazanes such as hexamethyldisilazane and divinyltetramethyldisilazane; silane coupling agents such as methyltrimethoxysilane, ethyltrimethoxysilane, propyltrimethoxysilane, butyltrimethoxysilane, dimethyldimethoxysilane, diethyldimethoxysilane, vinyltriethoxysilane, vinyltrimethoxysilane, trimethylmethoxysilane, triethylmethoxysilane, vinyltris(methoxyethoxy)silane, trimethylchlorosilane, dimethyldichlorosilane, divinyldimethoxysilane and chloropropyltrimethoxysilane; and organosilicon compounds such as polymethylsiloxane and organohydrogenpolysiloxane. After surface treatment with such treating agents, the resulting silica fine particles are hydrophobic and ready for use. Of these treating agents, the silane coupling agents and silazanes are preferred.

An appropriate amount of component (F) blended is up to 100 parts, specifically 0 to 100 parts, preferably 5 to 100 parts, more preferably 5 to 80 parts, and even more preferably 10 to 50 parts by weight per 100 parts by weight of component (A). Although it is acceptable to omit component (F), some minor problems may arise, for example, the cured rubber may have weak mechanical strength and molding, typically mold release become difficult. More than 100 pbw of component (F) is difficult to fill, aggravating working and processing efficiency.

Further, another organopolysiloxane may be blended in the composition as optional component (G). It is an organopolysiloxane containing at least three, preferably 3 to 50, and more preferably 3 to 20 silicon-bonded alkenyl groups per molecule. The organopolysiloxane containing at least three silicon-bonded alkenyl groups per molecule serves as a rubber reinforcement. Typically one or more organopolysiloxane having the average compositional formula (4) may be used as component (G).

$$R^5_f SiO_{(4-f)/2} \quad (4)$$

Herein $R^5$ is each independently an unsubstituted or substituted monovalent hydrocarbon group of 1 to 10 carbon atoms, preferably 1 to 8 carbon atoms, and f is a positive number in the range of 1.5 to 2.8, preferably 1.8 to 2.5, and more preferably 1.95 to 2.05.

Examples of the optionally substituted monovalent $C_1$-$C_{10}$ hydrocarbon group represented by $R^5$ include alkyl groups such as methyl, ethyl, propyl, isopropyl, butyl, isobutyl, tert-butyl, pentyl, neopentyl, hexyl, cyclohexyl, octyl, nonyl and decyl; aryl groups such as phenyl, tolyl, xylyl and naphthyl; aralkyl groups such as benzyl, phenylethyl and phenylpropyl; alkenyl groups such as vinyl, allyl, propenyl, isopropenyl, butenyl, hexenyl, cyclohexenyl and octenyl; and substituted forms of the foregoing groups in which some or all hydrogen atoms are replaced by halogen atoms (e.g., fluoro, bromo and chloro), cyano radicals or the like, such as chloromethyl, chloropropyl, bromoethyl, trifluoropropyl and cyanoethyl. It is preferred that at least 90 mol % of entire $R^5$ be methyl, and most preferably, all $R^5$ excluding alkenyl groups be methyl.

At least three of $R^5$ groups must be alkenyl groups, preferably of 2 to 8 carbon atoms, more preferably 2 to 6 carbon atoms, with vinyl being most preferred.

It is noted that the content of alkenyl groups is preferably $1.0 \times 10^{-6}$ to $1.5 \times 10^{-2}$ mol/g, and more preferably $1.0 \times 10^{-5}$ to $1.3 \times 10^{-2}$ mol/g of the alkenyl-containing organopolysiloxane (G) on the average. If the alkenyl content is less than $1.0 \times 10^{-5}$ mol/g, then no rubber reinforcement effect may be achieved. An alkenyl content in excess of $1.5 \times 10^{-2}$ mol/g may inhibit hydrosilylation or addition reaction. The alkenyl groups may be attached to silicon atoms at ends of the molecular chain and/or silicon atoms in the midway of the molecular chain.

With respect to the structure, the organopolysiloxane generally has a linear structure whose backbone is composed of recurring difunctional diorganosiloxane units (e.g., dialkylsiloxane, alkylalkenylsiloxane, alkylarylsiloxane, diarylsiloxane, or alkenylarylsiloxane) and which is capped with a triorganosiloxy group (e.g., alkenyldialkylsiloxy, alkenylalkylarylsiloxy, dialkenylalkylsiloxy or trialkenylsiloxy) at either end of the molecular chain. However, it may have in part a branched or cyclic structure. With respect to the molecular weight, the organopolysiloxane used herein has an average degree of polymerization of up to 1,500, specifically 100 to 1,500, and preferably 150 to 1,000. With an average DOP of less than 100, no satisfactory rubber feel may be obtained. An average DOP of more than 1,500 may lead to a high viscosity which is inconvenient to mold.

If used, component (G) is preferably blended in an amount of 0.1 to 100 parts, more preferably 0.2 to 50 parts by weight per 100 parts by weight of component (A). Absent component (G), rubber strength may be short. With too much amounts of component (G), rubber elongation may be substantially reduced and rubber elasticity be degraded.

In addition to the above-described components, various additives may be added to the addition curable self-adhesive silicone rubber composition of the invention. Such additives are selected for a particular purpose. Typical additives include metal oxides and composites thereof such as titanium oxide, iron oxide, cerium oxide, vanadium oxide, cobalt oxide, chromium oxide, and manganese oxide, and inorganic fillers, for example, quartz powder, diatomaceous earth, calcium carbonate, magnesium carbonate, alumina, carbon, hollow glass, hollow resins, conductive inorganic powders of gold, silver and copper, and metallized particle powder. Also, pigments, heat resistance modifiers, flame retardants, plasticizers, and reaction regulators (typically acetylene-based compounds such as ethynylcyclohexanol) may be added insofar as the desired properties are not impaired. These optional additives may be added in conventional amounts that would not hamper the benefits of the invention.

The silicone rubber composition can be obtained simply by uniformly admixing the above-described components (A) to (E) and optional components, preferably components (A) to (G) and optional components at room temperature. In an embodiment using component (F), preferably component (F) is uniformly mixed with all or a portion of component (A) in a planetary mixer or kneader where they are heat treated at a temperature of 100 to 200° C. for 1 to 4 hours. The mixture is cooled to room temperature, whereupon the remaining components are added and mixed.

Any desired molding technique may be selected depending on the viscosity of the composition. Any of casting, compression molding, dispenser molding, injection molding, extrusion molding, and transfer molding techniques is useful. The composition may be heat molded and cured, typically at a temperature of 60 to 200° C. for 10 seconds to 24 hours.

In molding the addition curable self-adhesive silicone rubber composition, a method capable of taking advantage of its adhesion is preferably used. Preferred is an insert molding method including mounting a member in a mold, placing an uncured composition in contact with the member, and curing the composition to form an integrally molded article. Also preferred is a two-color molding method including alternately injecting a molten or uncured organic resin and the composition into a mold to form an integrally molded article.

In order that the composition be effective in these molding methods, the composition should preferably have a viscosity at 25° C. in the range of 20 to 800 Pa·s, more preferably 50 to 600 Pa·s, and even more preferably 80 to 500 Pa·s at a shear rate of 10 s$^{-1}$. If the viscosity is outside the range, molding may become difficult.

The cure speed of the composition is not particularly limited as long as the aforementioned molding methods can be implemented. With a focus on molding efficiency, the composition should preferably meet 10 seconds≤T10≤60 seconds, more preferably 15 seconds≤T10≤40 seconds, provided that T10 is a 10% cure time (in sec) when measured at 130° C. for 3 minutes on a cure tester (e.g., rotorless disc rheometer or moving die rheometer (MDR)). If T10 is less than 10 seconds, the composition may cure too fast to mold. A T10 in excess of 60 seconds indicates a prolonged molding cycle which may be uneconomical.

In the test where the composition is cured in the cure tester under conditions of 130° C. and 3 minutes, a cure time versus stress curve is drawn. The 10% cure time; T10 is defined as a time duration (sec) from the cure start point until the stress reaches 10% of the maximum stress.

The addition curable self-adhesive silicone rubber composition may find use in many fields as integral articles of silicone rubber integrated with organic resins, for example, parts in precision electronic equipment such as mobile phones, mobile communications equipment, mobile computers, entertainment machines, watches, image receivers, DVD equipment, MD equipment and CD equipment, electric appliances such as microwave ovens, refrigerators, rice cookers, and flat panel displays (e.g., LC and plasma displays), business machines such as copiers, printers and facsimile machines, and automotive parts such as connector seals, ignition plug caps, and sensor parts.

The addition curable self-adhesive silicone rubber composition is bondable to various organic resins. Members with which the composition can be integrated are made of organic resins, typically thermoplastic resins such as olefin polymerization or polycondensation systems. Exemplary resins include acrylonitrile-butadiene-styrene (ABS) resins, polycarbonate (PC) resins, urethane (PU) resins, styrene resins, polyethylene (PE) resins, polypropylene (PP) resins, acrylic resins, polyethylene terephthalate (PET) resins, polybutylene terephthalate (PET) resins, polyphenylene oxide (PPO) resins, polyphenylene sulfide (PPS) resins, polysulfone resins, nylon (PA) resins, aromatic polyamide (aromatic PA) resins, polyimide (PI) resins, and liquid crystal resins.

The silicone rubber composition may be cured under suitable conditions. In order to acquire strong adhesion between the composition and the thermoplastic resin, the composition should preferably be cured at a temperature for a time such that the resin may not be deformed, melted or altered. Integrally molded articles are obtainable under curing conditions including a temperature of 60 to 220° C. and a time of 5 seconds to 30 minutes, especially 100 to 200° C. and 10 seconds to 10 minutes although the curing conditions vary with the type of resin.

The addition curable self-adhesive silicone rubber composition is bondable to organic resins even when the cured composition or silicone rubber has a high hardness. Specifically, the silicone rubber composition consistently establishes good adhesion to organic resins even when the cured composition or silicone rubber has a hardness of more than 40, especially more than 60 on JIS A durometer scale.

EXAMPLE

Examples of the invention are given below by way of illustration and not by way of limitation. All parts are by weight. DOP is a weight average degree of polymerization as determined versus polystyrene standards by GPC using toluene as development solvent.

Example 1

To 70 parts of dimethylpolysiloxane A1 capped with dimethylvinylsiloxy at either end of the molecular chain and having a viscosity of 30,000 mPa·s at 25° C. (DOP 710, vinyl value 0.000038 mol/g) were added 40 parts of fumed silica F1 having a BET specific surface area of 300 m²/g, 10 parts of hexamethyldisilazane, and 0.4 part of divinyltetramethyldisilazane. The contents were uniformly admixed in a kneader/mixer and further heat admixed at 150° C. for 3 hours, obtaining a silicone rubber base. To the silicone rubber base were added 30 parts of dimethylpolysiloxane A1, 10 parts of dimethylpolysiloxane G1 capped with trimethylsiloxy at either end of the molecular chain and having on average about 16 vinyl groups on side chains as substituent groups on diorganosiloxane units of the backbone (DOP 150, vinyl value 0.0014 mol/g), 0.5 part of organohydrogenpolysiloxane C1 capped with dimethylhydrogensiloxy at either end of the molecular chain wherein all silicon-bonded monovalent hydrocarbon groups other than silicon-bonded oxygen and hydrogen atoms are methyl (dimethylhydrogensiloxy-endcapped dimethylpolysiloxane, DOP 20, SiH content 0.0014 mol/g), 3.5 parts of organohydrogenpolysiloxane D1 capped with trimethylsiloxy at either end of the molecular chain and containing on average about 38 methylhydrogensiloxane units in the backbone wherein all silicon-bonded monovalent hydrocarbon groups other than silicon-bonded oxygen and hydrogen atoms are methyl (trimethylsiloxy-endcapped dimethylsiloxane/methylhydrogensiloxane copolymer, DOP 50, SiH content 0.011 mol/g), 1.3 parts of phenylene structure-bearing tackifier B1 having the formula (5):

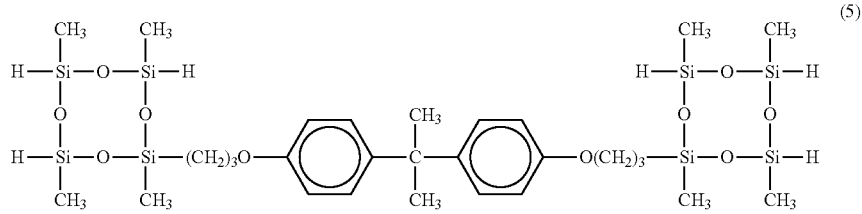

(SiH content 0.0079 mol/g), 0.1 part of 1 wt % chloroplatinic acid in 2-ethylhexanol, and 0.05 part of 50 wt % ethynyl cyclohexanol in ethanol as a reaction regulator. The contents were uniformly admixed for about 30 minutes, yielding a silicone rubber composition. In this silicone rubber composition, a molar ratio of total SiH functional groups to total alkenyl groups, that is, SiH/alkenyl ratio was 2.3; and a molar ratio of SiH functional groups in organohydrogenpolysiloxane C1 to alkenyl groups in dimethylpolysiloxane A1, that is, SiH/alkenyl ratio was 0.19.

Using a precision rotational viscometer RotoVisco RV1 (Eko Instruments Co., Ltd.), the viscosity of the silicone rubber composition at 25° C. and a shear rate of 10 s$^{-1}$ was measured to be 450 Pa·s. An ability to cure at 130° C. was measured by a moving die rheometer MDR2000 (Alpha Technologies), finding T10=25 seconds.

The silicone rubber composition was press-cured at 150° C. for 5 minutes and post-cured in an oven at 150° C. for 2 hours into a cured sample, which was measured for hardness, tensile strength and elongation at break according to JIS K6249. The results are shown in Table 1.

In another test, test pieces (~25×50×2 mm) of polycarbonate (PC), polybutylene terephthalate (PBT), aromatic polyamide (aromatic PA), and polyphenylene oxide (PPO) were placed in molds. The silicone rubber composition was fed thereon and press-cured at 150° C. for 3 minutes into a rubber layer of 1 to 3 mm thick. From the integrally molded article, the rubber layer was manually peeled. Adhesion was evaluated in terms of cohesive failure (rubber failure rate). It is noted that when the rubber layer is manually peeled from the integrally molded article, the cohesive failure (rubber failure rate) indicates a percentage of an area where separation occurs within the adhesive without interfacial separation, relative to the overall adhesion area. The results are shown in Table 2.

Example 2

To 70 parts of dimethylpolysiloxane A1 (in Example 1) were added 40 parts of fumed silica F2 having a BET specific surface area of 200 m$^2$/g, 6 parts of hexamethyldisilazane, 0.3 part of divinyltetramethyldisilazane, and 2 parts of water. The contents were uniformly admixed in a kneader/mixer and further heat admixed at 150° C. for 3 hours, obtaining a silicone rubber base. To the silicone rubber base were added 30 parts of dimethylpolysiloxane A2 capped with dimethylvinylsiloxy at either end of the molecular chain and having a viscosity of 1,000 mPa·s at 25° C. (DOP 210, vinyl value 0.00013 mol/g) (vinyl value 0.000064 mol/g as the average of dimethylpolysiloxane A1 having alkenyl only at each end of the molecular chain and dimethylpolysiloxane A2), 10 parts of dimethylpolysiloxane G2 capped with dimethylvinylsiloxy at either end of the molecular chain and having on average about 45 vinyl groups on side chains as substituent groups on diorganosiloxane units of the backbone (DOP 420, vinyl value 0.0015 mol/g), 0.8 part of cyclic organohydrogenpolysiloxane C2 having two SiH groups per molecule, represented by the formula (6):

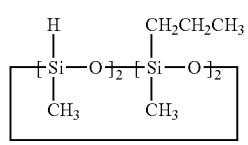

(6)

(SiH content 0.0062 mol/g), 5.1 parts of organohydrogenpolysiloxane D1 (in Example 1), 1.5 parts of phenylene structure-bearing tackifier B2 having the formula (7):

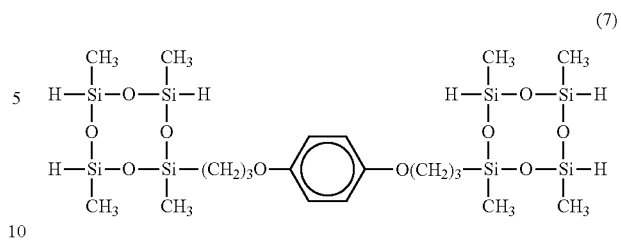

(7)

(SiH content 0.0096 mol/g), 0.1 part of 1 wt % chloroplatinic acid in 2-ethylhexanol, and 0.12 part of 50 wt % ethynyl cyclohexanol in ethanol as reaction regulator. The contents were uniformly admixed for about 30 minutes, yielding a silicone rubber composition. In this silicone rubber composition, a molar ratio of total SiH functional groups to total alkenyl groups, that is, SiH/alkenyl ratio was 3.0; and a molar ratio of SiH functional groups in organohydrogenpolysiloxane C2 to total alkenyl groups in dimethylpolysiloxanes A1 and A2, that is, SiH/alkenyl ratio was 0.78.

As in Example 1, the silicone rubber composition was analyzed for viscosity and cure, finding a viscosity of 360 Pa·s and T10=28 seconds. Also as in Example 1, the cured sample was measured for hardness, tensile strength and elongation as well as adhesion. The results are shown in Tables 1 and 2.

Example 3

To 60 parts of dimethylpolysiloxane A3 capped with dimethylvinylsiloxy at either end of the molecular chain and having a viscosity of 10,000 mPa·s at 25° C. (DOP 510, vinyl value 0.000053 mol/g) were added 30 parts of hydrophobic surface treated fumed silica F3 having a BET specific surface area of 230 m$^2$/g (Reolosil DM30S by Tokuyama Corp.), 5 parts of hexamethyldisilazane, and 2 parts of water. The contents were uniformly admixed in a kneader/mixer and further heat admixed at 150° C. for 3 hours, obtaining a silicone rubber base. To the silicone rubber base were added 40 parts of dimethylpolysiloxane A1 (in Example 1) (vinyl value 0.000046 mol/g as the average of dimethylpolysiloxane A1 having alkenyl only at each end of the molecular chain and dimethylpolysiloxane A3), 1.0 part of organohydrogenpolysiloxane C3 capped with trimethylsiloxy at either end of the molecular chain and having on average two SiH groups on side chains as methylhydrogensiloxane units wherein all silicon-bonded monovalent hydrocarbon groups other than silicon-bonded oxygen and hydrogen atoms are methyl (trimethylsiloxy-endcapped dimethylsiloxane/methylhydrogensiloxane copolymer, DOP 10, SiH content 0.0023 mol/g), 0.5 part of organohydrogenpolysiloxane D2 capped with trimethylsiloxy at either end of the molecular chain and containing on average about 10 methylhydrogensiloxane units in the backbone wherein all silicon-bonded monovalent hydrocarbon groups other than silicon-bonded oxygen and hydrogen atoms are methyl (trimethylsiloxy-endcapped dimethylsiloxane/methylhydrogensiloxane copolymer, DOP 20, SiH content 0.0069 mol/g), 0.4 part of phenylene structure-bearing tackifier B3 having the formula (8):

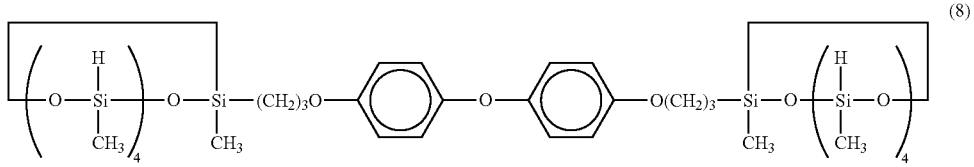

(SiH content 0.0088 mol/g), 0.1 part of 1 wt % chloroplatinic acid in 2-ethylhexanol, and 0.12 part of 50 wt % ethynyl cyclohexanol in ethanol as reaction regulator. The contents were uniformly admixed for about 30 minutes, yielding a silicone rubber composition. In this silicone rubber composition, a molar ratio of total SiH functional groups to total alkenyl groups, that is, SiH/alkenyl ratio was 2.0; and a molar ratio of SiH functional groups in organohydrogenpolysiloxane C3 to total alkenyl groups in dimethylpolysiloxanes A1 and A3, that is, SiH/alkenyl ratio was 0.50.

As in Example 1, the silicone rubber composition was analyzed for viscosity and cure, finding a viscosity of 280 Pa·s and T10=24 seconds. Also as in Example 1, the cured sample was measured for hardness, tensile strength and elongation as well as adhesion. The results are shown in Tables 1 and 2.

Comparative Example 1

To 70 parts of dimethylpolysiloxane A1 (in Example 1) were added 40 parts of fumed silica F1 having a BET specific surface area of 300 m²/g, 10 parts of hexamethyldisilazane, and 0.4 part of divinyltetramethyldisilazane. The contents were uniformly admixed in a kneader/mixer and further heat admixed at 150° C. for 3 hours, obtaining a silicone rubber base. To the silicone rubber base were added 30 parts of dimethylpolysiloxane A1, 10 parts of dimethylpolysiloxane G1 (in Example 1), 3.5 parts of organohydrogenpolysiloxane D1 (in Example 1), 1.3 parts of tackifier B1 (in Example 1), 0.1 part of 1 wt % chloroplatinic acid in 2-ethylhexanol, and 0.05 part of 50 wt % ethynyl cyclohexanol in ethanol as reaction regulator. The contents were uniformly admixed for about 30 minutes, yielding a silicone rubber composition. In this silicone rubber composition, a molar ratio of total SiH functional groups to total alkenyl groups, that is, SiH/alkenyl ratio was 2.2.

As in Example 1, the silicone rubber composition was analyzed for viscosity and cure, finding a viscosity of 460 Pa·s and T10=27 seconds. Also as in Example 1, the cured sample was measured for hardness, tensile strength and elongation as well as adhesion. The results are shown in Tables 1 and 2.

Comparative Example 2

To 70 parts of dimethylpolysiloxane A1 (in Example 1) were added 40 parts of fumed silica F2 having a BET specific surface area of 200 m²/g, 6 parts of hexamethyldisilazane, 0.3 part of divinyltetramethyldisilazane, and 2 parts of water. The contents were uniformly admixed in a kneader/mixer and further heat admixed at 150° C. for 3 hours, obtaining a silicone rubber base. To the silicone rubber base were added 30 parts of dimethylpolysiloxane A2 (in Example 2), 10 parts of dimethylpolysiloxane G2 (in Example 2), 1.0 part of organohydrogenpolysiloxane D3 capped with dimethylhydrogensiloxy at either end of the molecular chain and containing on average two SiH groups in the midway of the molecular chain as methylhydrogensiloxane units wherein all silicon-bonded monovalent hydrocarbon groups other than silicon-bonded oxygen and hydrogen atoms are methyl (dimethylhydrogensiloxy-endcapped dimethylsiloxane/methylhydrogensiloxane copolymer, DOP 16, SiH content 0.0035 mol/g), 5.1 parts of organohydrogenpolysiloxane D1 (in Example 1), 1.5 parts of tackifier B2 (in Example 2), 0.1 part of 1 wt % chloroplatinic acid in 2-ethylhexanol, and 0.12 part of 50 wt % ethynyl cyclohexanol in ethanol as reaction regulator. The contents were uniformly admixed for about 30 minutes, yielding a silicone rubber composition. In this silicone rubber composition, a molar ratio of total SiH functional groups to total alkenyl groups, that is, SiH/alkenyl ratio was 3.0.

As in Example 1, the silicone rubber composition was analyzed for viscosity and cure, finding a viscosity of 340 Pa·s and T10=28 seconds. Also as in Example 1, the cured sample was measured for hardness, tensile strength and elongation as well as adhesion. The results are shown in Tables 1 and 2.

TABLE 1

|  | Example | | | Comparative Example | |
|---|---|---|---|---|---|
|  | 1 | 2 | 3 | 1 | 2 |
| Hardness, Durometer type A | 65 | 64 | 41 | 66 | 65 |
| Tensile strength (MPa) | 8.3 | 8.0 | 9.6 | 7.7 | 8.4 |
| Elongation at break (%) | 490 | 450 | 640 | 400 | 460 |

TABLE 2

|  | Example | | | Comparative Example | |
|---|---|---|---|---|---|
|  | 1 | 2 | 3 | 1 | 2 |
| PC | ○ | ○ | ○ | X | X/Δ |
| PBT | ○ | ○ | ○ | Δ | Δ |
| Aromatic PA | ○ | ○ | ○ | Δ | Δ |
| PPO | ○ | ○ | ○ | X | X |

Symbols have the following meaning.
○: cohesive failure ≥ 80%
Δ: 30% ≤ cohesive failure < 80%
X/Δ: 0% < cohesive failure < 30%
X: cohesive failure = 0% (peeled)

Japanese Patent Application No. 2012-181686 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:
1. An addition curable self-adhesive silicone rubber composition comprising
   (A) 100 parts by weight of a linear organopolysiloxane containing one silicon-bonded alkenyl group at each end of the molecular chain, but no alkenyl group in the midway of the molecular chain, having an average degree of polymerization of up to 1,500, and being liquid at room temperature, (B) 0.1 to 10 parts by weight of an organosilicon compound of 1 to 100 silicon atoms containing at least one phenylene structure and at least one silicon-bonded hydrogen atom per molecule, (C) 0.01 to 10 parts by weight of an organohydrogenpolysiloxane containing two silicon-bonded hydrogen atoms per molecule, but no phenylene structure in the molecule, (D) 0.1 to 30 parts by weight of an organohydrogenpolysiloxane containing at least three silicon-bonded hydrogen atoms per molecule, but no phenylene structure in the molecule, and (E) a catalytic amount of an addition reaction catalyst, wherein a molar ratio of total silicon-bonded hydrogen atoms in components (B), (C) and (D) to alkenyl groups in component (A) is in a range of from 1.0 to 5.0, and a molar ratio of silicon-bonded hydrogen atoms in component (C) to alkenyl groups in component (A) is in a range of from 0.01 to 1.0.

2. The silicone rubber composition of claim 1, further comprising (F) 5 to 100 parts by weight of reinforcing silica fine powder.

3. The silicone rubber composition of claim 1, further comprising (G) 0.1 to 100 parts by weight of an organopolysiloxane containing at least three silicon-bonded alkenyl groups per molecule, wherein a molar ratio of total silicon-bonded hydrogen atoms in components (B), (C) and (D) to total alkenyl groups in components (A) and (G) is in a range of from 1.0 to 5.0.

4. The silicone rubber composition of claim 1, which has a 10% cure time T10 of 10 seconds to 60 seconds when measured at 130° C. for 3 minutes and is used in injection molding.

5. The silicone rubber composition of claim 1, wherein component (A) is an organopolysiloxane having the formula (1):

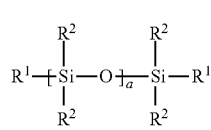

(1)

wherein each $R^1$ is independently an alkenyl group of 2 to 10 carbon atoms, each $R^2$ is independently a substituted or unsubstituted monovalent hydrocarbon group of 1 to 10 carbon atoms free of any aliphatic unsaturated bond, and "a" is an integer of up to 1,500.

6. The silicone rubber composition of claim 1, wherein component (B) is selected from the group consisting of the following organosilicon compounds:

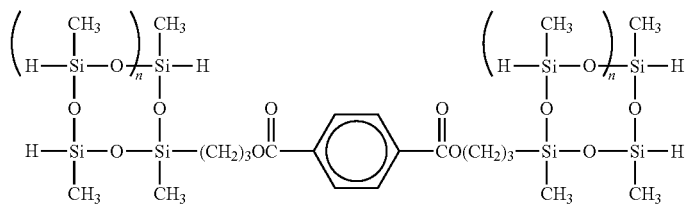

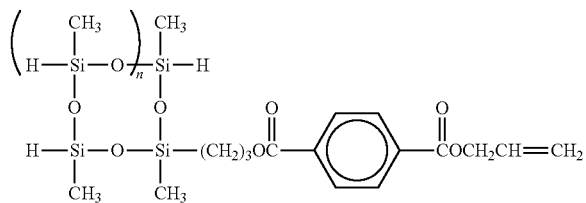

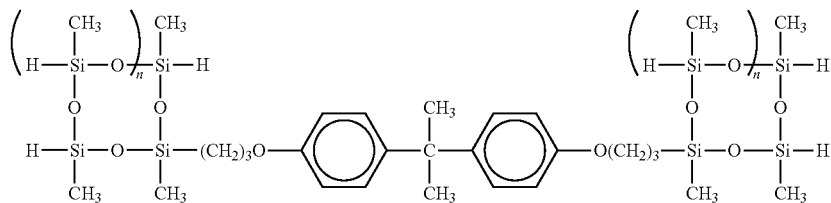

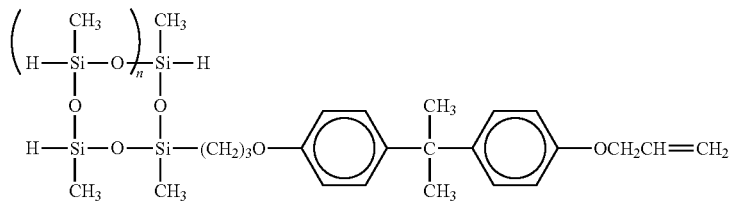

-continued
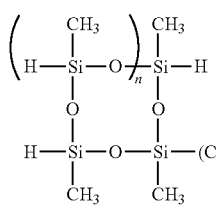
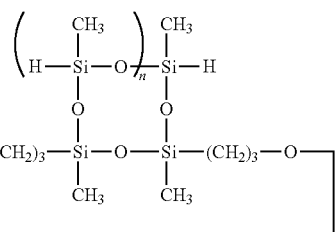
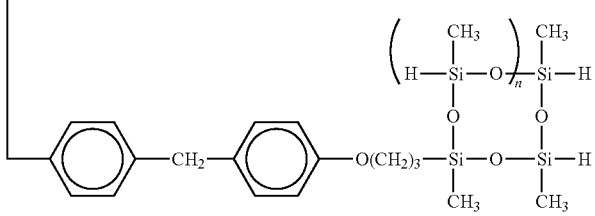
wherein n is independently an integer of 1 to 4,
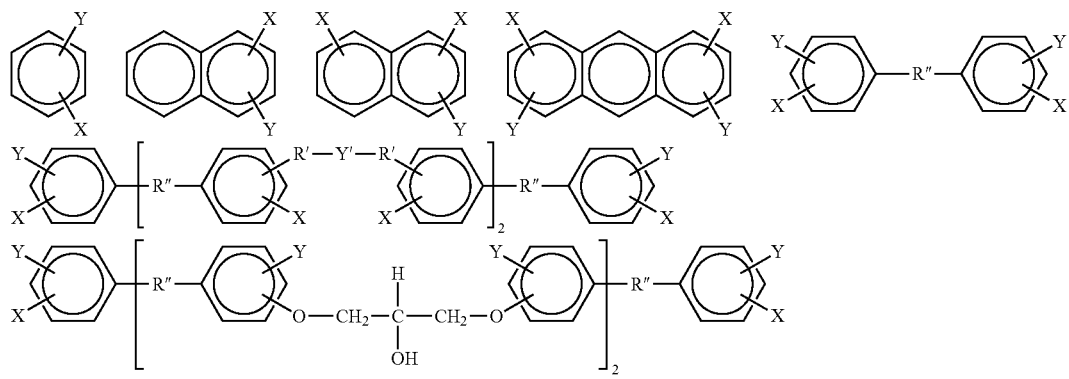
wherein X is
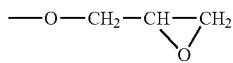
and Y is either of the following groups:
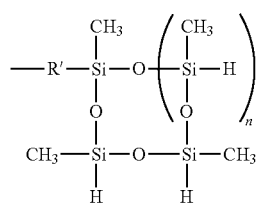
wherein n is an integer of 1 to 4,
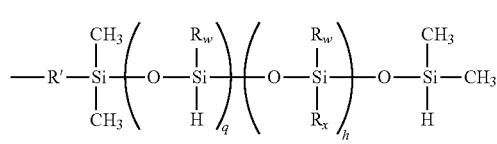
wherein R' is a group selected from the following,
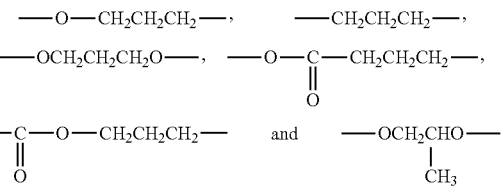
Rw and Rx each are a substituted or unsubstituted monovalent hydrocarbon group, q=1 to 50 and h=0 to 100,
R" is a group selected from the following,
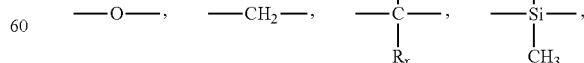
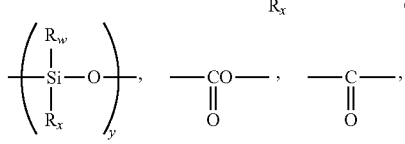

-continued

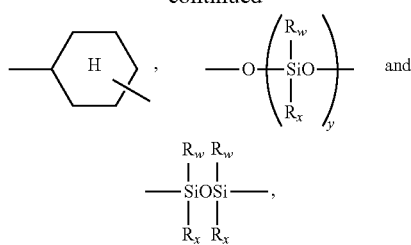 and wherein Rw and Rx are as defined above, and y=0 to 100,
Y is either of the following groups:

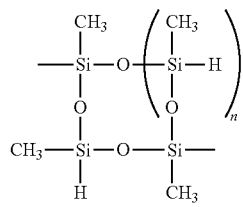

wherein n is an integer of 1 to 4,

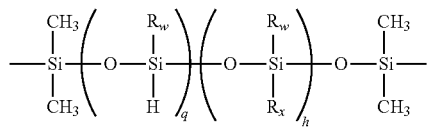

wherein Rw, Rx, q and h are as defined above, and z=1 to 10.

7. The silicone rubber composition of claim 1, wherein component (C) is selected from the group consisting of compounds having structures of the general formulae (2a) to (2c):

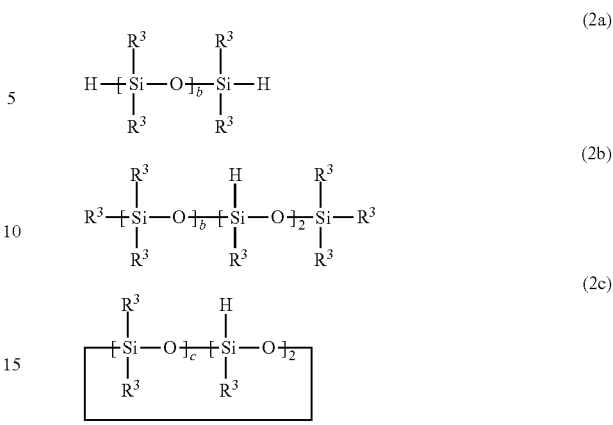

wherein $R^3$ is a substituted or unsubstituted monovalent hydrocarbon group of 1 to 10 carbon atoms, b is an integer of 0 to 300, and c is an integer of 2 to 10.

8. The silicone rubber composition of claim 1, wherein component (D) is an organohydrogenpolysiloxane having the following average compositional formula (3):

$$R^4_d H_e SiO_{(4-d-e)/2} \quad (3)$$

wherein $R^4$ is an unsubstituted or halo-substituted monovalent hydrocarbon group of 1 to 10 carbon atoms free of aliphatic unsaturation, d is a positive number of 0.7 to 2.1, e is a positive number of 0.001 to 1.0, and d+e is from 0.8 to 3.0, wherein said organohydrogenpolysiloxane has at least three SiH groups per molecule.

9. The silicone rubber composition of claim 3, wherein component (G) is an organopolysiloxane having the following average compositional formula (4):

$$R^5_f SiO_{(4-f)/2} \quad (4)$$

wherein each $R^5$ is independently an unsubstituted or substituted monovalent hydrocarbon group of 1 to 10 carbon atoms, and f is a positive number in the range of 1.5 to 2.8, at least three of $R^5$ being alkenyl groups.

* * * * *